United States Patent
Ide et al.

(10) Patent No.: US 11,030,298 B2
(45) Date of Patent: Jun. 8, 2021

(54) CANDIDATE USER PROFILES FOR FAST, ISOLATED OPERATING SYSTEM USE

(71) Applicant: Microsoft Technology Licensing, LLC, Redmond, WA (US)

(72) Inventors: Nathan Jeffrey Ide, Bothell, WA (US); Ibrahim Mohammad Ismail, Kirkland, WA (US); Robert Bradley Gilbert, Kirkland, WA (US); Haitao Wang, Sammamish, WA (US); Matthew Jonathan Joplin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/378,020

(22) Filed: Apr. 8, 2019

(65) Prior Publication Data

US 2020/0320187 A1    Oct. 8, 2020

(51) Int. Cl.
*G06F 21/00*  (2013.01)
*G06F 21/45*  (2013.01)

(52) U.S. Cl.
CPC ...... *G06F 21/45* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 2005/0166263 A1* | 7/2005 | Nanopoulos | .......... | H04L 9/3228 726/7 |
| 2005/0278550 A1* | 12/2005 | Mahone | .............. | H04M 15/00 713/189 |
| 2007/0180509 A1* | 8/2007 | Swartz | ................. | G06F 9/4406 726/9 |
| 2010/0306533 A1* | 12/2010 | Phatak | ................... | G06F 21/40 713/156 |
| 2013/0229951 A1* | 9/2013 | Raleigh | ............ | G06Q 10/06375 370/259 |
| 2016/0350721 A1* | 12/2016 | Comerford | ........ | G06Q 10/1095 |
| 2017/0235848 A1* | 8/2017 | Van Dusen | ........... | G06F 16/904 705/12 |

OTHER PUBLICATIONS

Nuakoh, Emmanuel B.; Coffie, Isaac. MonitR®: A Mobile Application for Monitoring Online Accounts' Security. SoutheastCon 2018. https://ieeexplore.ieee.org/stamp/stamp.jsp?tp=&arnumber=8478857 (Year: 2018).*

(Continued)

*Primary Examiner* — Jeremiah L Avery
(74) *Attorney, Agent, or Firm* — Arent Fox LLP (57) ABSTRACT

Methods and devices for using candidate accounts on a computer device may include creating on the computer device, a candidate account representing a blank user profile for use on the computer device. The methods and devices may include automatically logging in the candidate account and locking the computer device. The methods and devices may include creating a user specific isolated environment on the computer device for the candidate account.

20 Claims, 7 Drawing Sheets

(56) References Cited

OTHER PUBLICATIONS

Xiong, Jin et al. Improving data availability for a cluster file system through replication. 2008 IEEE International Symposium on Parallel and Distributed Processing. https://ieeexplore.ieee.org/stamp/stamp.jsp?tp=&arnumber=4536154 (Year: 2008).*

Gupta, Aditi et al. Intuitive Security Policy Configuration in Mobile Devices Using Context Profiling. 2012 International Conference on Privacy, Security, Risk and Trust and 2012 International Confernece on Social Computing, https://ieeexplore.ieee.org/stamp/stamp.jsp?tp=&arnumber=6406389 (Year: 2012).*

Kurihara, Shun et al. Estimation of Power Consumption of Each Application Caused by Device Lock Considering Software Dependency in Smartphones. 2017 Fifth International Symposium on Computing and Networking (CANDAR). https://ieeexplore.ieee.org/stamp/stamp.jsp?tp=&arnumber=8345491 (Year: 2017).*

\* cited by examiner

CANDIDATE USER PROFILES FOR FAST, ISOLATED OPERATING SYSTEM USE

BACKGROUND

The present disclosure relates to operating systems on computer devices.

Operating systems on computer devices may allow a plurality of users to log into a computer device. The operating systems may also provide a per user customization and isolation on the computer device. The per user customization may cause delays in a first access by the user to the computer device and/or slow a returning access by the user to the computer device.

Thus, there is a need in the art for improvements in operating systems on computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, at least one processor configured to communicate with the memory, and an operating system configured to communicate with the memory and the processor, wherein the operating system is operable to: create a candidate account representing a blank user profile for use on the computer device; automatically login the candidate account and lock the computer device; and create a user specific isolated environment on the computer device for the candidate account.

Another example implementation relates to a method for using candidate accounts on a computer device. The method may include creating, at an operating system on the computer device, a candidate account representing a blank user profile for use on the computer device. The method may include automatically logging in the candidate account and locking the computer device. The method may include creating a user specific isolated environment on the computer device for the candidate account.

Another example implementation relates to computer-readable medium storing instructions executable by a computer device. The computer-readable medium may include at least one instruction for causing the computer device to create a candidate account representing a blank user profile for use on the computer device. The computer-readable medium may include at least one instruction for causing the computer device to automatically login the candidate account and lock the computer device. The computer-readable medium may include at least one instruction for causing the computer device to create a user specific isolated environment on the computer device for the candidate account.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to operating systems that may allow a plurality of users to log into a computer device, such as, a multiuser operating system. Multiuser operating systems may provide per user customization and/or isolation on a computer device by creating per-user data stores called profiles. Profiles may be created in the local cache for each user and may provide a bundle of local states for each user (e.g., internet favorites, documents created by the user, user preferences, etc.). Creating profiles per user may add significant delays to a first access by a user to a computer device.

In addition, multi-user operating systems may launch processes on the computer device under the context of each user to enforce isolation at runtime. Without an identity of a user being available prior to runtime, the processes may be unable to launch and may further slow access of a returning user to the computer device. For example, in schools and/or corporations, one computer device may be shared by a number of users and a user may rarely use the same computer device twice. Thus, a user may almost always use a computer device for a first time, which may result in significant delays when accessing the computer device.

The operating system may create a candidate profile for a candidate account on the computer device that may be associated with a user account when that user later arrives at the computer device. For instance, the candidate account and its associated profile may be set up in response to a trigger, such as, but not limited to, powering on the computer, booting up the computer, locking the computer, signing out of a user account, switching users on the computer device, and/or a detectable period of time the computer device is idle. The candidate profile may be a blank user profile that is established before the identity of the user is known and may be used to launch the processes on the computer device to enforce isolation at runtime for the user. As such, a per user operating system context may be launched without needing to know the identity of the user.

The candidate profile may simulate a user being present at the computer device and may cause generation and logging in of the candidate account on the computer device, e.g., in a session, so that one or more initial processes for creating the candidate account and/or states and/or privileges associated with the candidate account may launch prior to the user accessing the computer device. For example, folders, documents, and/or other user settings may be created prior to the user arriving at the computer device. Thus, at least a part of the processing time required to setup the user account on the computer device may occur prior to the user arriving at the computer device.

In response to a user logging into the computer device, the methods and devices may transform the previously created candidate profile to represent the now arriving user. The arriving user may be mapped or connected to the pre-prepared candidate account taking advantage of the processes already running for the candidate profile. In addition, the user profile information (e.g., local settings, documents previously created, favorites, etc.) may be available for use when the user logs into the computer device.

As such, the methods and devices may preserve the per user isolation and returning user access to the computer device, while achieving the performance for a returning, active, user on the computer device, even at a first access by the user to the computer device, resulting in an improvement in the user experience of the computer device.

Figure 1:
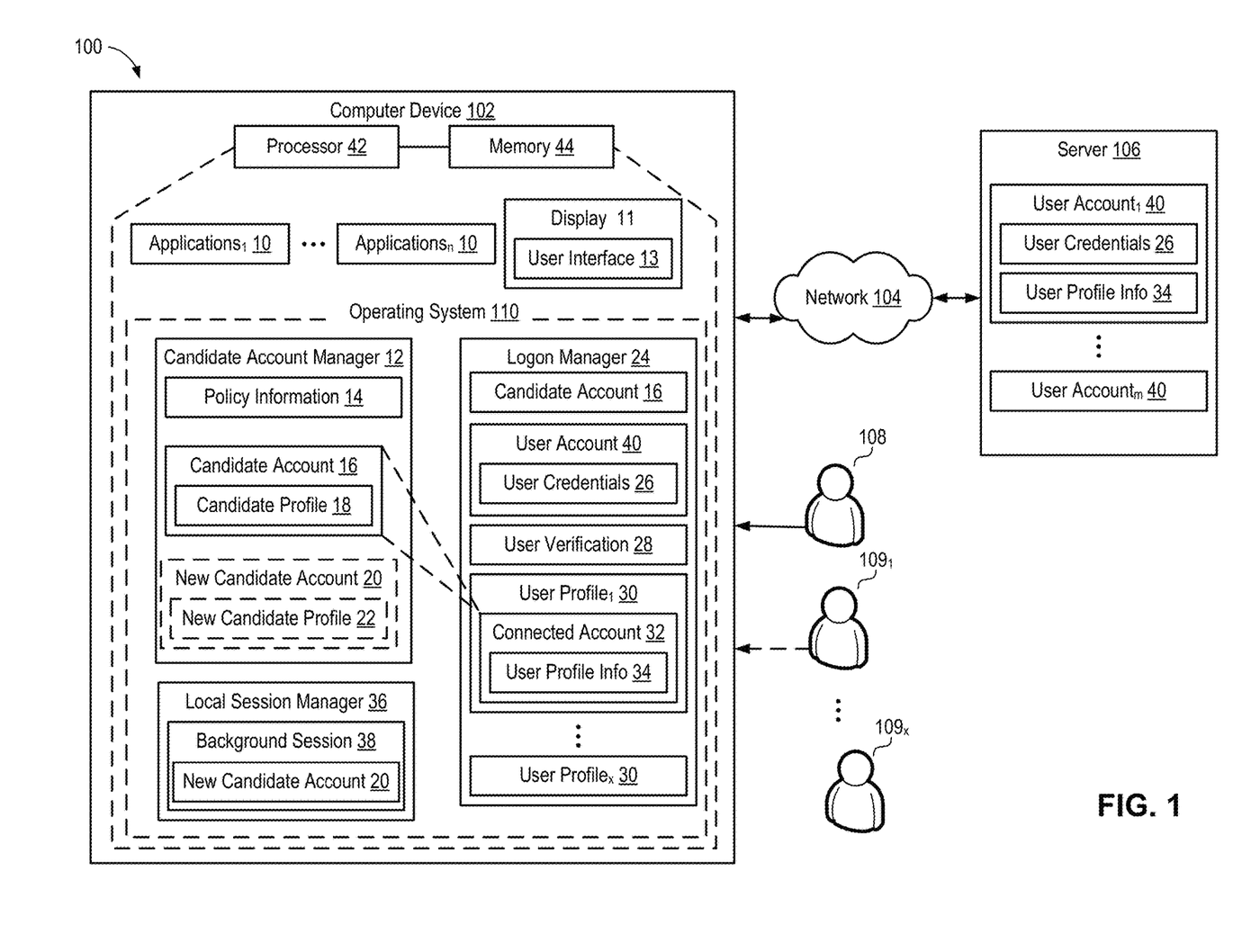
FIG. 1 is a schematic block diagram of an example computer device in accordance with an implementation of the present disclosure.

Referring now to FIG. 1, illustrated is an example system 100 for use with a candidate account 16 on a computer device 102. Candidate account 16 may include a candidate profile 18 that is a blank user profile established before the identity of user 108, 109 is known and may be used to launch processes, states, and/or privileges on computer device 102 to enforce isolation at runtime for users 108, 109. For example, candidate account 16 may be used to log on to a session with the operating system, and the logged on session may be locked but available immediate for use when a user is presented with a Logon/Unlock prompt presented on user interface 13 of display 11. Also, for example, the processes, states, and/or privileges that may be launched and/or setup based on creating of candidate account 16 may include, but are not limited to, general per-user application registration and configuration activities, and/or launching of various services.

Computer device 102 may include any mobile or fixed computer device, which may be connectable to a network. Computer device 102 may be, for example, a computer device such as a desktop or laptop or tablet computer, an internet of things (TOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 110 that allows a plurality of users 108, 109 (up to x, where x is an integer) to log into computer device 102. Each of the plurality of users 108, 109 may be able to log into computer device 102 using a respective set of user credentials 26 that each uniquely identifies a corresponding user 108, 109. Each set of user credentials 26 may include, but is not limited to, one or any combination of a user name and/or password, biometric information, a personal identification number (PIN), or any other form of unique identifier. Each set of user credentials 26 may be used to access a corresponding one of a potential plurality of user accounts 40 on computer device 102 for each of the plurality of users 108, 109.

Operating system 110 may further provide per user customization and/or isolation for each of the plurality of users 108, 109 on computer device 102 by providing per user data stores on computer device 102, such as, user profiles 30 for each user 108, 109. Each user profile 30 may include a bundle of local states for each of the plurality of users 108, 109. Each user profile 30 may include user profile information 34 with personal settings and/or account information associated with each of the plurality of users 108, 109. For example, user profile information 34 may include, but is not limited to, internet favorites, documents created by the user, photographs, user preferences, user interface (UI) customizations, such as, theme colors and icon organization, and/or applications installed by the user. Computer device 102 may receive the user profile information 34 for the user account 40 from a cloud service or network hosted service and/or server 106 via a wired or wireless network 104.

In an implementation, computer device 102 may provide the user credentials 26 to a cloud service or network hosted service and/or server 106. Server 106 may retrieve the user profile information 34 and/or any other account settings for the user account 40 associated with the user credentials 26. Server 106 may transmit the user profile information 34 and/or any other account settings to computer device 102. As such, when each user 108, 109 accesses computer device 102, personal settings associated with a user account 40 for the user 108, 109 may be provided on computer device 102 based on the received user profile information 34.

Operating system 110 may be executed by processor 42 and/or memory 44. Memory 44 of computer device 102 may be configured for storing data and/or computer-executable instructions defining and/or associated with operating system 110, and processor 42 may execute such data and/or instructions to instantiate operating system 110. An example of memory 44 can include, but is not limited to, a type of memory usable by a computer, such as random access memory (RAM), read only memory (ROM), tapes, magnetic discs, optical discs, volatile memory, non-volatile memory, and any combination thereof. An example of processor 42 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may include a candidate account manager 12 that generates the candidate account 16 when computer device 102 is turned on and/or a boot event occurs on computer device 102. For instance, the candidate account 16 and its associated candidate profile 18 may be set up in response to a trigger, such as, but not limited to, powering on computer device 102, booting up computer device 102, locking computer device 102, signing out of a user account on computer device 102, switching users on computer device 102, and/or a detectable period of time computer device 102 is idle. As mentioned above, candidate profile 18 may be a blank user profile established before the identity of user 108, 109 is known. In other words, candidate account 16 is a pre-logged on account where a session is established but locked. In an implementation, candidate account 16 being pre-logged includes providing operating system 110 with an indication that a "Sign In" button has already been pressed and triggers operating system 110 to proceed as if it was, which may result in operating system 110 directly entering a network hosted state that is ready to receive user credentials 26 that may be authenticated by a network interface, e.g., hosted by server 106. Candidate account 16 may include candidate profile 18 that establishes the security identity of the candidate account 16 and/or provides a bundle of local states and/or privileges for the candidate account 16. The candidate profile 18 may create account settings for candidate account 16. In other words, candidate account 16 may simulate a user logging into computer device 102 before user 108, 109 even arrives at computer device 102. As such, the processing for setting up and/or creating a user specific isolated environment on computer device 102 (e.g., general per-user application registration and configuration activities and/or launching of various services) may occur upon computer device 102 powering on and/or booting up for the first time prior to the user 108, 109 accessing the computer device 102.

In an implementation, candidate account manager 12 may only create candidate account 16 in response to receiving policy information 14 indicating that computer device 102 should create candidate account 16. For example, the policy information 14 may instruct computer device 102 to create candidate account 16 in response to a machine boot of computer device 102. In addition, policy information 14 may instruct computer device 102 to create candidate accounts when an existing candidate account is connected. For example, when candidate account 16 is used when user 108 logs into computer device, candidate account manager 12 may create a new candidate account 20 with a new candidate profile 22 that is ready for the next user 109 to log into computer device 102. As such, candidate account manager 12 may ensure that a candidate account 16 is available for use on computer device 102.

Candidate account manager 12 may determine whether candidate account 16 already exists on computer device 102. If candidate account 16 does not exist, candidate account manager 12 may create candidate account 16. If candidate account 16 exists, logon manager 24 may login candidate account 16 to computer device 102 and lock computer device 102. By logging in candidate account 16, the processes for setting up the candidate profile 18 may already be running on computer device 102. As such, the time and/or processing required to create a user specific isolated environment in operating system 110 may occur when candidate account 16 is logged into computer device 102 prior to user 108 logging into computer device 102.

Logon manager 24 may receive user credentials 26 from a user 108 to log into a user account 40 on computer device 102. Logon manager 24 may perform a user verification 28 to determine whether user 108 previously logged into computer device 102 and/or whether a user profile 30 already exists for user 108. If user 108 has already logged into computer device 102 and/or has a preexisting user profile 30, logon manager 24 may log into user account 40 and access the preexisting user profile 30 for user 108.

If user 108 has not previously logged into computer device 102 and/or a user profile 30 does not exist for user 108, logon manager 24 may provide the user credentials 26 to a cloud service or network hosted service and/or server 106 and may receive the user profile information 34 and/or any other account settings associated with user credentials 26 from server 106.

Logon manager 24 may also create a user profile 30 for user 108 by connecting the user profile 30 with the established candidate account 16 to generate a connected account 32 with the user profile information 34 for user 108. By connecting the user profile 30 to the already established candidate account 16, the processes already running on computer device 102 may be used by user profile 30. As such, the amount of time computer device 102 takes to sign-in user 108 may be reduced. Upon the connection occurring between candidate account 16 and user profile 30, candidate account 16 may no longer be candidate account 16 and may now be part of the connected account 32 in user profile 30. As such, candidate account manager 12 may create a new candidate account 20 for the next user 109 to use when logging into computer device 102.

In response to the user logging out of user account 40 on computer device 102, the session for user account 40 is stopped and the processes running on computer device 102 associated with user account 40 are stopped and/or removed from computer device 102. In addition, the user profile 30 associated with user 108 may be removed from computer device 102. In an implementation, user profiles 30 may remain on computer device 102 for a period of time. A determination may be made whether to remove user profile 30 from computer device 102 after user 108 logs off of computer device 102. For example, the determination may be based on a given time period (e.g., a day, a week, or a month) and/or a percentage of the memory used by the user profiles 30.

The local session manager 36 may create a new background session 38 to automatically logon the new candidate account 20 with a new candidate profile 22 at various phases, for example, in response to policy information 14. Local session manager 36 may create a new logon session in the background when candidate account 16 is connected to user profile 30, when user 108 is logging in to computer device 102. In addition, or alternatively, local session manager 36 may create a new logon session in the foreground when user 108 locks computer device 102 and/or when user 108 logs out of computer device 102.

When local session manager 36 creates a new background session 38 for the next candidate user, logon manager 24 may login a new candidate account 20 with a new candidate profile 22 and lock computer device 102. As such, the processing required to create a user specific isolated environment for a new user 109 on computer device 102 may start occurring at various points depending on policy information 14, after user 108 logs in. When a next user 109 logs into computer device 102, the user profile 30 for user 109 may be connected with the new candidate account 20.

By using new candidate account 20, transitioning between users 108, 109 on computer device 102 may occur faster. Moreover, the processing for establishing isolated user environments may occur prior to the user identity being known by computer device 102. As such, computer device 102 may achieve the performance for a returning, active user 108 on computer device 102, even at the user's 108 first access to computer device 102, resulting in an improvement in the users experience of computer device 102.

Figure 2A:
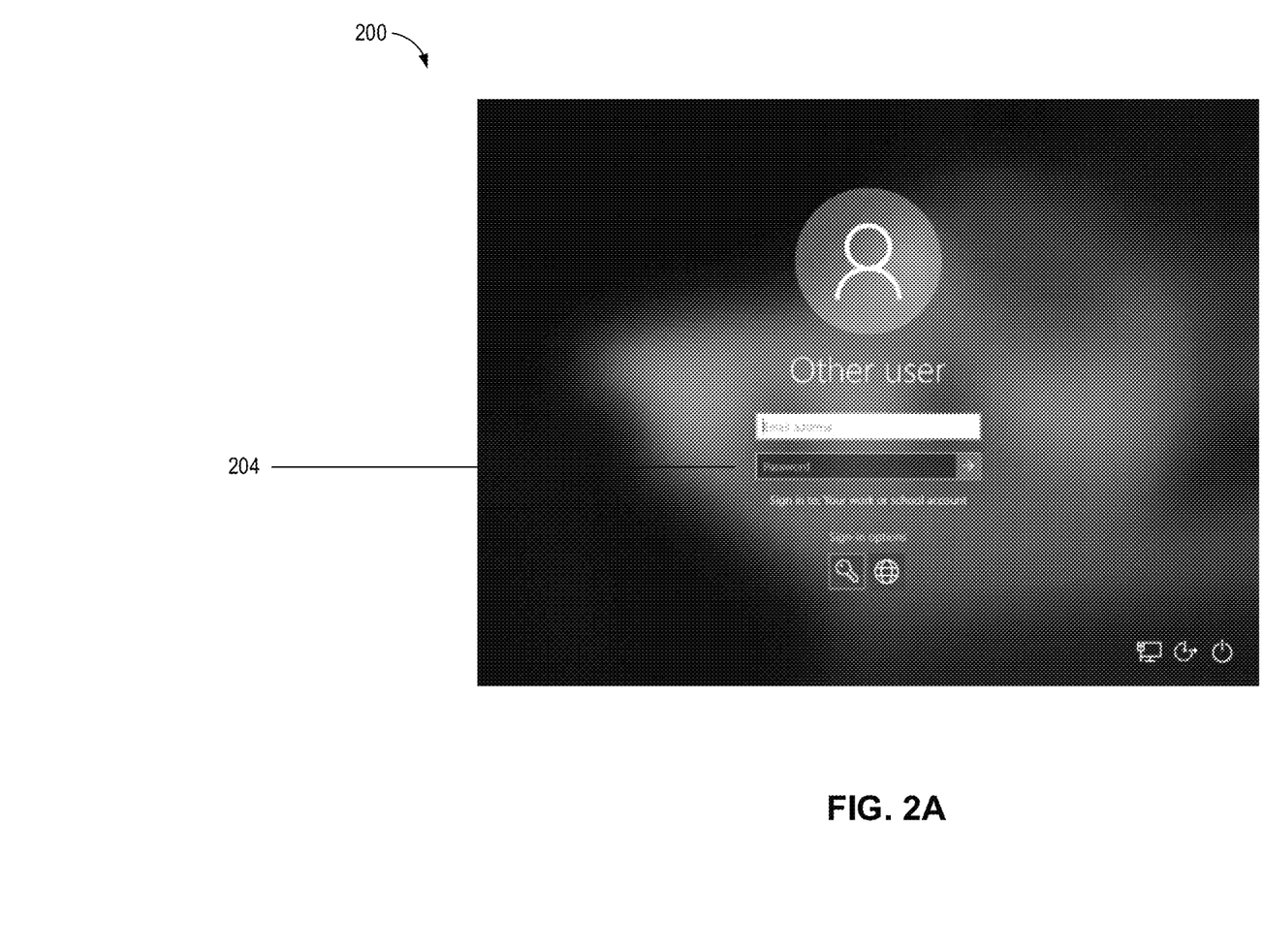
FIG. 2A is an example user interface screen of a candidate account logged into a computer device in accordance with an implementation of the present disclosure.

Referring now to FIG. 2A, illustrated is an example user interface of a lock screen 200 associated with candidate account 16 (FIG. 1) logged into computer device 102 (FIG. 1). By logging in candidate account 16, the processes for setting up the candidate profile 18 (FIG. 1) for candidate account 16 may already be running on computer device 102. As such, the time and/or processing required to create a user specific isolated environment in operating system 110 (FIG. 1) may occur when candidate account 16 is logged into computer device 102 and computer device 102 is locked waiting for a user 108 to log into computer device 102. A user 108 may use email address and password fields 204 to log into computer device 102.

Figure 2B:
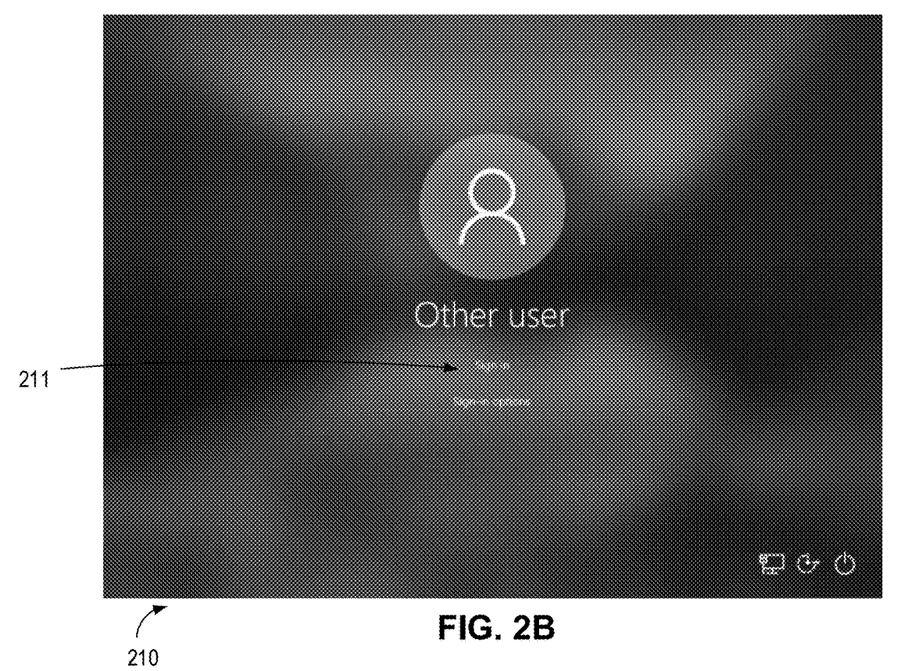
FIGS. 2B and 2C are examples of a network hosted user interface screen of a candidate account logged into a computer device in accordance with an implementation of the present disclosure.
Figure 2C:
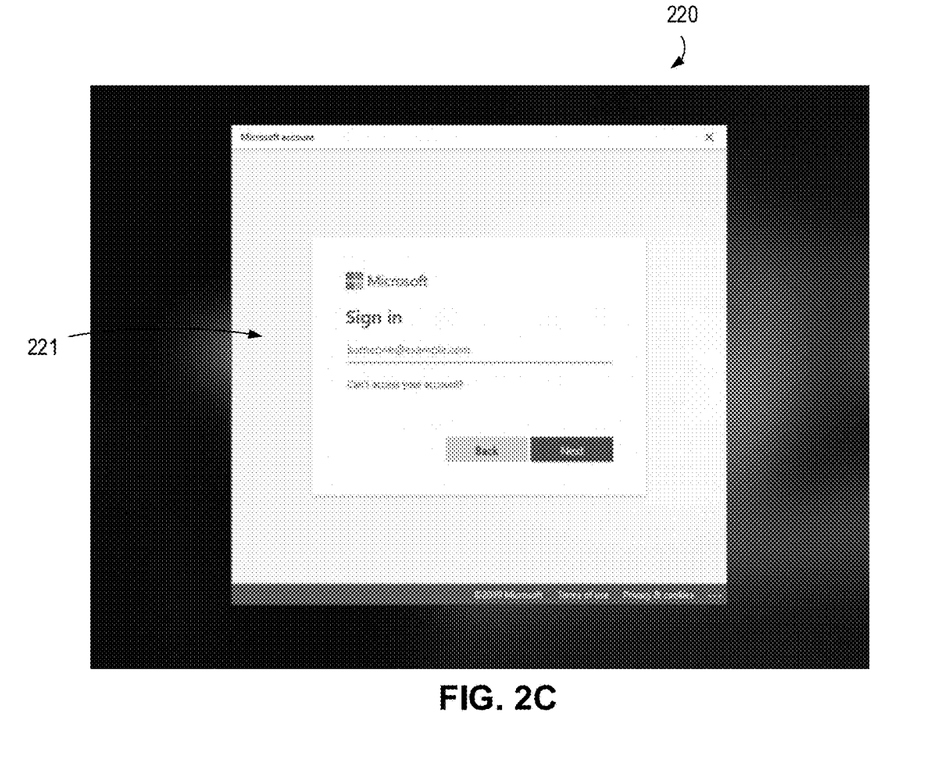

Referring to FIGS. 2B and 2C, illustrated are example of a network hosted user interface screens 210, 220 associated with a web hosted logon option for a user 108. User interface screen 210 is another example of a user interface of a lock screen associated with candidate account 16 (FIG. 1) logged into computer device 102 (FIG. 1). Upon clicking on sign in link 211, a web page 221 is launched on computer device 102 that is hosted by server 106.

Figure 3A:
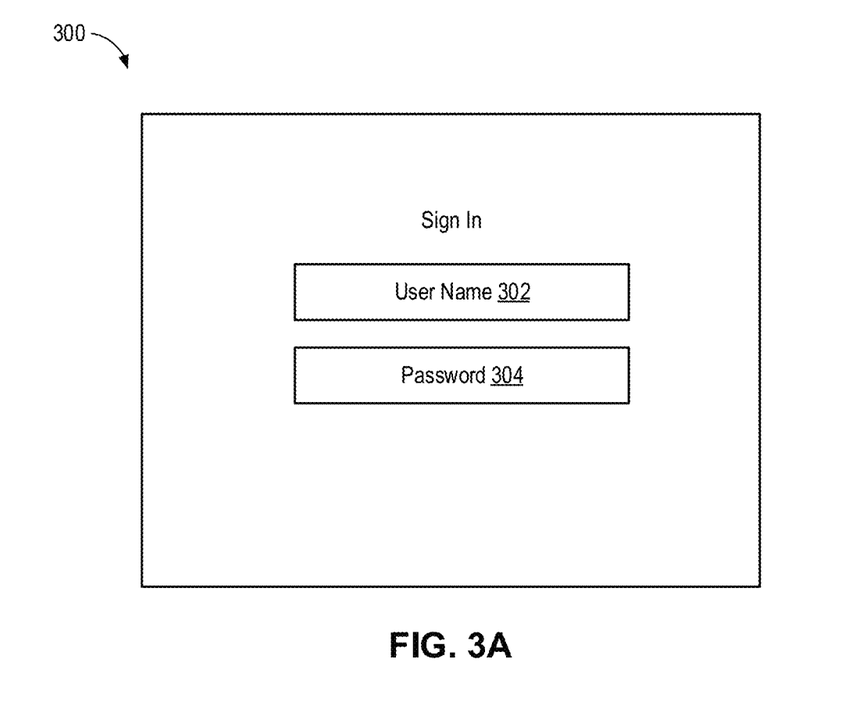
FIGS. 3A and 3B are example user interface screens of a user account logged into a computer device in accordance with an implementation of the present disclosure.
Figure 3B:
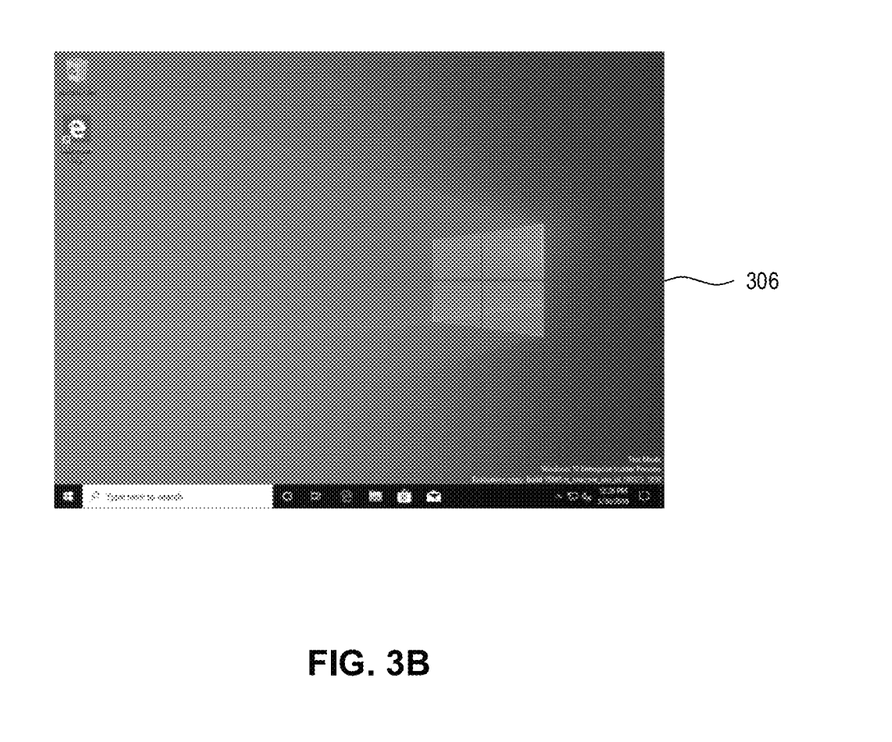

Referring now to FIGS. 3A and 3B, illustrated are example user interface screens 300, 306 of a user account 40 (FIG. 1) logged into computer device 102 (FIG. 1) from the lock screen 200 (FIG. 2A). FIG. 3A illustrates a user interface screen 300 for a sign in screen that allows a respective one of user 108, 109 (FIG. 1) to log into computer device 102. For example, the respective user 108, 109 may enter in a user name 302 and/or password to log into a user account 40 associated with the respective user 108, 109 that may be authenticated by a web hosted credential provider (FIG. 2C), e.g., hosted by server 106. Computer device 102 may use the already running processes for candidate account 16 when logging in user account 40. As such, computer device 102 may login user account 40 faster by taking advantage of the already running processes for candidate account 16.

FIG. 3B illustrates a personalized desktop 306 that may be displayed on computer device 102 when a respective one of user 108, 109 logs into computer device 102. Desktop 306 may include any applications 10 (FIG. 1) the respective user 108, 109 may use and/or any personal settings the respective user 108, 109 may have selected.

Figure 4A:
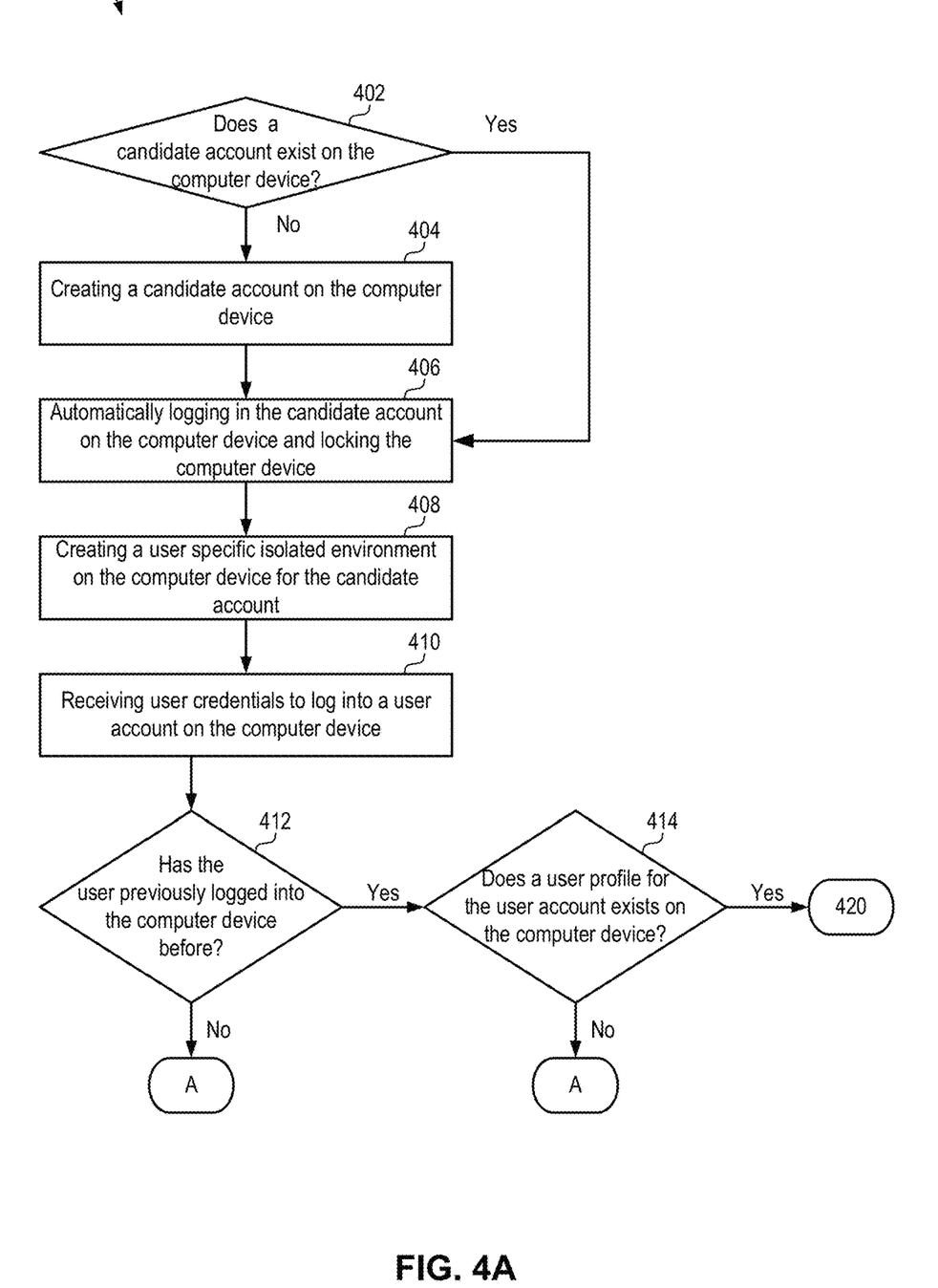
FIGS. 4A and 4B are a flowchart of an example method for using candidate accounts on a computer device in accordance with an implementation of the present disclosure.
Figure 4B:
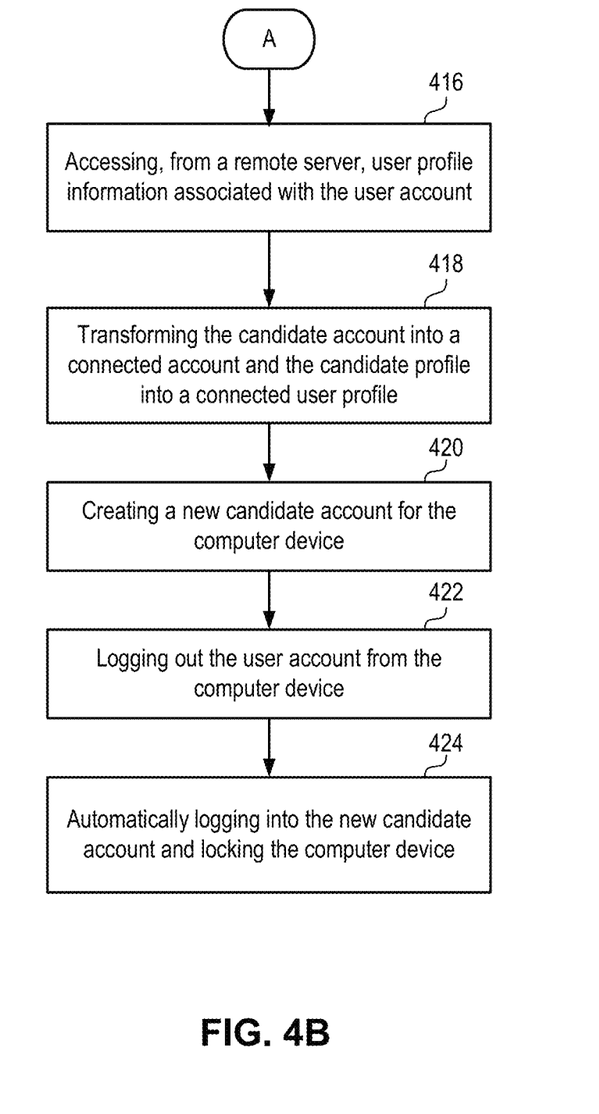

Referring now to FIGS. 4A and 4B, an example method 400 may be used by computer device 102 (FIG. 1) for using a candidate account 16 (FIG. 1) on computer device 102. The actions of method 400 may be discussed below with reference to the architecture of FIG. 1.

At 402, method 400 may include determining whether a candidate account exists on the computer device. Candidate account manager 12 may determine whether candidate account 16 already exists on computer device 102. For example, in response to computer device 102 powering on and/or a boot event occurring, candidate account manager 12 may determine whether candidate account 16 already exists on computer device 102. If candidate account 16 already exists on computer device, method 400 may proceed to 406.

At 404, method 400 may include creating a candidate account on the computer device if a candidate account does not already exist on the computer device. Candidate account manager may create a candidate account 16 that may include a candidate profile 18. Candidate profile 18 may be a blank user profile established before the identity of user 108, 109 is known. In an implementation, candidate account manager 12 may only create candidate account 16 in response to receiving policy information 14 indicating that computer device 102 should create candidate account 16. For example, the policy information 14 may instruct computer device 102 to create candidate account 16 in response to in response to a trigger, such as, but not limited to, powering on computer device 102, booting up computer device 102, locking computer device 102, signing out of a user account on computer device 102, switching users on computer device 102, and/or a detectable period of time computer device 102 is idle. In addition, policy information 14 may instruct computer device 102 to create candidate accounts when an existing candidate account 16 is connected. As such, candidate account manager 12 may ensure that a candidate account 16 is available for use on computer device 102.

At 406, method 400 may include automatically logging in the candidate account on the computer device and locking the computer device. Logon manager 24 may login candidate account 16 to computer device 102 and lock computer device 102. Candidate account 16 may simulate a user logging into computer device 102 before user 108, 109 even arrives at computer device 102. In response to locking the computer device 102, display 11 may present on user interface 13 a network hosted login and/or a generic login user interface that enables the user 108, 109 to enter their user credentials 26.

At 408, method 400 may include creating a user specific isolated environment on the computer device for the candidate account. Candidate account 16 may include a candidate profile 18 that establishes the security identity of the candidate account 16 and/or provides a bundle of local states for the candidate account 16. The candidate profile 18 may also create account settings for candidate account 16. By logging in the candidate account 16, the processing of setting up and/or creating user specific isolated environment on computer device 102 may occur upon computer device 102 powering on and/or booting up for the first time prior to the user 108, 109 accessing the computer device 102. In one implementation, the generic login user interface may be presented on user interface 13 while, e.g., contemporaneously with, the session being established for the candidate profile 18. As such, the time and/or processing required to create a user specific isolated environment in operating system 110 may occur when candidate account 16 is logged into computer device 102 prior to user 108 logging into computer device 102.

At 410, method 400 may include receiving user credentials to log into a user account on the computer device. For example, user 108 may enter their user credentials 26 using the generic login presented on user interface 13. Logon manager 24 may receive user credentials 26 from a user 108 to log into a user account 40 on computer device 102. User credentials 26 may include, but are not limited to, a user name and/or password, biometric information, a personal identification number, or any other form of unique identity. The user credentials 26 may be used to access user accounts 40 on computer device 102 for each of the plurality of users 108, 109.

At 412, method 400 may include determining whether the user previously logged into the computer device. Logon manager 24 may perform a user verification 28 to determine whether user 108 previously logged into computer device 102 and/or whether a user profile 30 already exists for user 108. If user 108 has not previously logged into computer device 102, method 400 may proceed to 416.

At 414, method 400 may include determining whether a user profile for the user account exists on the computer device in response to determining that the user previously logged into the computer device. If user 108 has already logged into computer device 102 and/or has a preexisting user profile 30, logon manager 24 may log into user account 40 and access the preexisting user profile 30 for user 108, and method 400 may proceed to 420.

At 416 method 400 may include accessing, from a remote server, user profile information associated with the user account in response to determining that the user has not previously logged into the computer device and/or the user does not have a user profile on the computer device. If user 108 has not previously logged into computer device 102 and/or a user profile 30 does not exists for user 108, logon manager 24 may provide the user credentials 26 to a cloud service or a network hosted service, and/or server 106 and may receive the user profile information 34 and/or any other account settings associated with user credentials 26 from server 106.

At 418, method 400 may include transforming the candidate account into a connected account and the candidate profile into a connected user profile. Logon manager 24 may transform the candidate account 16 into a connected account 32 by transforming the candidate profile 18 into a user profile 30 for user 108 by connecting the user profile 30 with the established candidate account 16 to generate a connected account 32 with the user profile information 34 for user 108. For example, user account information and/or user profile information 34 may be added into the candidate profile 18, turning the candidate profile 18 into the user profile 30. By connecting the user profile 30 to the already established candidate account 16, the processes already running on computer device 102 may be used by user profile 30. Moreover, upon the connection occurring between candidate account 16 and user profile 30, candidate account 16 may no longer be candidate account 16 and may now be part of the connected account 32 in user profile 30.

At 420, method 400 may include creating a new candidate account for the computer device. In response to a new user account being setup, which uses the pre-existing candidate account 16, candidate account manager 12 may create a new candidate account 20 for the next user 109 to use when logging into computer device 102. As such, candidate account manager 12 may ensure that new candidate account 20 is available for use on computer device 102 for a next user 109.

At 422, method 400 may include logging out the user account from the computer device. For example, logon manager 24 may log out user account 40 when user 108 is finished using computer device 102. In response to the user logging out of user account 40 on computer device 102, the background session 38 is stopped and the processes running on computer device 102 associated with user account 40 are stopped and/or removed from computer device 102. In addition, the user profile 30 associated with user 108 may be removed from computer device 102. In an implementation, user profiles 30 may remain on computer device 102 for a period of time. A determination may be made whether to remove user profile 30 from computer device 102 after user 108 logs off of computer device 102. For example, the determination may be based on a given time period (e.g., a day, a week, or a month) and/or a percentage of the memory used by the user profiles 30.

At 424, method 400 may include automatically logging into the new candidate account and locking the computer device. The local session manager 36 may create a new background session 38 to automatically logon the new candidate account 20 with a new candidate profile 22 at various phases, for example, in response to policy information 14. Local session manager 36 may create a new logon session in the background when candidate account 16 is connected to user profile 30, when user 108 is logging in to computer device 102. In addition, or alternatively, local session manager 36 may create a new logon session in the foreground when user 108 locks computer device 102 and/or when user 108 logs out of computer device 102. Logon manager 24 may login a new candidate account 20 with a new candidate profile 22 and lock computer device 102. As such, the time and/or processing required to create a user specific isolated environment for a new user 109 on computer device 102 may start occurring when user 108 logs out.

In response to locking the computer device 102, display 11 may present on user interface 13 a network hosted login and/or a generic login user interface that enables a next user 109 and/or user 108 to enter their user credentials 26. When a next user 109 logs into computer device 102, the user profile 30 for user 109 may be connected with the new candidate account 20.

Method 400 may allow the processing for establishing isolated user environments to occur prior to the user identity being known by computer device 102. As such, computer device 102 may achieve the performance for a returning, active, user 108 on computer device 102, even at the user's 108 first access to computer device 102, resulting in an improvement in the users experience of computer device 102. Moreover, method 400 may provide a faster transition between users 108, 109 on computer device 102.

Figure 5:
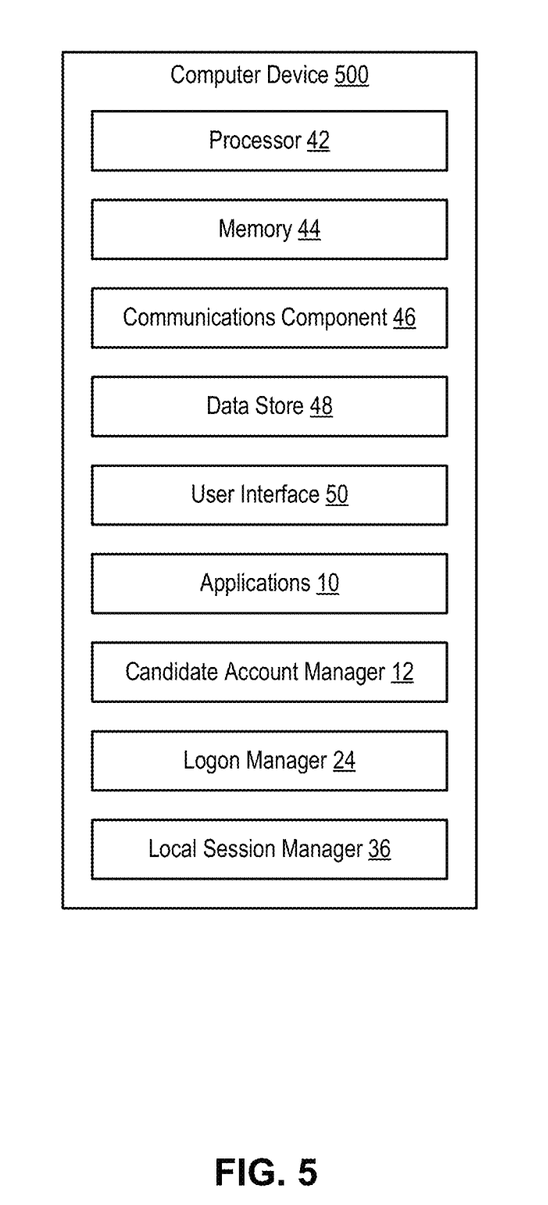
FIG. 5 is a schematic block diagram of an example device in accordance with an implementation of the present disclosure.

Referring now to FIG. 5 an example computer 500 that may be configured as computer device 102 in accordance with an implementation includes additional component details as compared to FIG. 1. In one example, computer 500 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer 500 may further include memory 44, such as for storing local versions of applications being executed by processor 42. Memory 44 can include a type of memory usable by a computer, such as random access memory (RAM), read only memory (ROM), tapes, magnetic discs, optical discs, volatile memory, non-volatile memory, and any combination thereof. Additionally, processor 42 may include and execute operating system 110 (FIG. 1).

Further, computer 500 may include a communications component 46 that provides for establishing and maintaining communications with one or more parties utilizing hardware, software, and services as described herein. Communications component 46 may carry communications between components on computer device 102, as well as between computer device 102 and external devices, such as devices located across a communications network and/or devices serially or locally connected to computer device 102. For example, communications component 46 may include one or more buses, and may further include transmit chain components and receive chain components associated with a transmitter and receiver, respectively, operable for interfacing with external devices.

Additionally, computer 500 may include a data store 48, which can be any suitable combination of hardware and/or software, that provides for mass storage of information, databases, and programs employed in connection with implementations described herein. For example, data store 48 may be a data repository for applications 10, candidate account manager 12, logon manager 24, and/or local session manager 36.

Computer 500 may also include a user interface component 50 operable to receive inputs from a user of computer device 102 and further operable to generate outputs for presentation to the user. User interface component 50 may include one or more input devices, including but not limited to a keyboard, a number pad, a mouse, display 11 (e.g., which may be a touch-sensitive display), a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of applications 10, candidate account manager 12, logon manager 24, and/or local session manager 36. In addition, processor 42 executes applications 10, candidate account manager 12, logon manager 24, and/or local session manager 36, and memory 44 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
at least one processor configured to communicate with the memory; and
an operating system configured to communicate with the memory and the at least one processor, wherein the operating system is operable to:
create a candidate account representing a blank user profile for use on the computer device;
automatically login the candidate account and lock the computer device; and
create a user specific isolated environment on the computer device for the candidate account.

2. The computer device of claim 1, wherein the candidate account further includes a candidate profile used to launch processes on the computer device to enforce the user specific isolated environment.

3. The computer device of claim 2, wherein the operating system is further operable to:
- receive user credentials to log into a user account on the computer device;
- access user profile information associated with the user account; and
- transform the candidate profile to a connected user profile for the computer device with a connected account.

4. The computer device of claim 3, wherein the connected account uses the processes for the user specific isolated environment already running on the computer device.

5. The computer device of claim 3, wherein the user profile information includes personalized settings for the user account.

6. The computer device of claim 3, wherein the operating system is further operable to access the user profile information from a remote server.

7. The computer device of claim 3, wherein the operating system is further operable to:
- create a new candidate account for the computer device in response to the connected account being created.

8. The computer device of claim 7, wherein the operating system is further operable to:
- log out the user account from the computer device;
- automatically login on the new candidate account; and
- lock the computer device.

9. The computer device of claim 1, wherein the operating system is further configured to create the candidate account in response to at least one of receiving policy information indicating when to create the candidate account, a boot event occurring on the computer device, the computer device powering on, or logging out of a user account.

10. A method for using candidate accounts on a computer device, comprising:
- creating, at an operating system on the computer device, a candidate account representing a blank user profile for use on the computer device;
- automatically logging in the candidate account and locking the computer device; and
- creating a user specific isolated environment on the computer device for the candidate account.

11. The method of claim 10, wherein the candidate account further includes a candidate profile used to launch processes on the computer device to enforce the user specific isolated environment.

12. The method of claim 11, further comprising:
- receiving user credentials to log into a user account on the computer device;
- accessing user profile information associated with the user account; and
- transform the candidate profile to a connected user profile for the computer device with a connected account.

13. The method of claim 12, wherein the connected account uses the processes for the user specific isolated environment already running on the computer device.

14. The method of claim 12, wherein the user profile information includes personalized settings for the user account.

15. The method of claim 12, wherein the user profile information is accessed from a remote server.

16. The method of claim 12, further comprising:
- creating a new candidate account for the computer device in response to the connected account being created.

17. The method of claim 16, further comprising:
- logging out the user account from the computer device;
- automatically logging in the new candidate account; and
- locking the computer device.

18. The method of claim 10, creating the candidate account occurs in response to at least one of receiving policy information indicating when to create the candidate account, a boot event occurring on the computer device, the computer device powering on, or logging out of a user account.

19. A non-transitory computer-readable medium storing instructions executable by a computer device, comprising:
- at least one instruction for causing the computer device to create a candidate account representing a blank user profile for use on the computer device;
- at least one instruction for causing the computer device to automatically login the candidate account and lock the computer device; and
- at least one instruction for causing the computer device to create a user specific isolated environment on the computer device for the candidate account.

20. The non-transitory computer-readable medium of claim 19, wherein the candidate account further includes a candidate profile used to launch processes on the computer device to enforce the user specific isolated environment.

* * * * *